United States Patent Office 3,502,430
Patented Mar. 24, 1970

3,502,430
PROCESS FOR PREPARING AMMONIUM
PERCHLORATE
Joseph Sanlaville, Pierre-Benite, France, assignor to Ugine
Kuhlman, Paris, France, a French company
No Drawing. Filed Mar. 28, 1967, Ser. No. 626,392
Claims priority, application France, Mar. 29, 1966,
55,308
Int. Cl. C01b 11/18
U.S. Cl. 23—85    5 Claims

ABSTRACT OF THE DISCLOSURE

Ammonium perchlorate is prepared by reacting sodium perchlorate with a stoichiometric amount of ammonium sulfate in an anhydrous ammonia under superatmospheric pressure and at an ambient temperature. The amount of liquid ammonia used is sufficient to provide a final ammoniacal solution containing about 10% to 55% of ammonium perchlorate.

BACKGROUND OF THE INVENTION

Field of the invention

This invention relates to the production of substantially anhydrous ammonium perchlorate having a purity in excess of 98% by weight.

Description of the prior art

Ammonium perchlorate is generally prepared by reacting sodium or potassium perchlorate with an ammonium salt, such as ammonium chloride. In most of the prior processes, the reaction is carried out by mixing aqueous solutions of the reactants. The concentrations of the solutions are such that the resultant ammonium perchlorate precipitates out of the aqueous medium. The ammonium perchlorate crystals recovered therefrom contain 5% to 10% by weight of the mother liquor. The product is usually contaminated with the water soluble alkali salt, the byproduct of the reaction, in the mother liquor.

To purify the ammonium perchlorate thus obtained, a recrystallization technique carrying out in an aqueous medium is generally used. Since the impurities to be removed or separated from ammonium perchlorate is soluble in the aqueous medium, it becomes a necessity to discard the mother liquor for recrystallization when concentration of the impurities therein reaches a level whereby ammonium perchlorate of a required purity cannot be obtained therefrom. The discarding of the mother liquor reduces the yield of the perchlorate due to the loss of ammonium perchlorate still in the liquor. Attempts to recover the perchlorate in the mother liquor by evaporation are limited by the thermal sensitivity and instability of the perchlorate and are considered to be economically unattractive due to the large thermal energy required for the evaporation.

The ammonium perchlorate produced by these prior processes is moist and requires tedious and expensive drying operations in order to produce an anhydrous product. The inherent thermal instability of the compound limits the maximum drying temperature to below 150° C. which is the decomposition temperature of ammonium perchlorate.

In an attempt to overcome some of the disadvantages stated hereinabove, a process was devised to prepare anhydrous amonium perchlorate by reacting potassium perchlorate and ammonium chloride in liquid ammonia. The anhydrous ammonium perchlorate produced according to the process has limited purity, i.e., less than 96%, due to the high solubility of potassium chloride in liquid ammonia. The process is further limited to the use of the higher cost potassium perchlorate instead of the more readily available sodium perchlorate. The limitation is due to the still higher solubility of sodium chloride, the byproduct if sodium perchlorate is used, in liquid ammonia.

SUMMARY OF THE INVENTION

I have found that anhydrous ammonium perchlorate of exceptionally high purity can be produced by reacting sodium perchlorate or potassium perchlorate with about a stoichiometric amount of ammonium sulfate in a substantially anhydrous liquid ammonia. The reaction is carried out at a temperature and a pressure sufficient to maintain the ammonia in the liquid state. The amount of ammonia used is sufficient to provide a final concentration of ammonium perchlorate in the ammonia equivalent to at least 10% by weight but less than the saturation point to avoid precipitation of ammonia perchlorate therefrom. The alkali sulfate thus produced is precipitated out and is removed from the reaction medium by filtration. The ammonium perchlorate recovered from the reaction medium has a purity of at least about 98% by weight.

In addition to the exceptionally high purity product that can be produced, the process of this invention has further advantages over the prior processes. It can, for example, use the cheaper sodium perchlorate for preparing ammonium perchlorate with purity exceeding 98%. The process of the present invention may also be carried out in a smaller volume of reaction medium due to the higher solubility of ammonium perchlorate in liquid ammonia than in water. In liquid ammonia, a final concentration of ammonium perchlorate can be achieved in an ambient temperature (room temperature).

DESCRIPTION OF THE PREFERRED EMBODIMENTS

According to the present invention, the reaction of sodium perchlorate or potassium perchlorate with ammonium sulfate preferably is carried out at the ambient temperature of the laboratory or manufacturing plant in a gas light reaction vessel, such as an autoclave. At this temperature, the liquid ammonia vaporizes rapidly within the reaction vessel until an equilibrium pressure within the autoclave is reached. At normal room temperature of 25° C. for example, the pressure developed within the autoclave is about 12 kg./cm.$^2$. Under this pressure and temperature, the reaction proceeds rapidly forming the highly soluble ammonium perchlorate and the substantially insoluble or sparingly soluble alkali sulfate, which is precipitated out from the reaction medium and can be removed therefrom simply by filtration. The filtration preferably is also carried out under the pressure of the ammonia gas.

Subsequent to the filtration step, the pressure exerted on the filtrate can then be reduced gradually by releasing the ammonia vapor. The evaporation of the liquid ammonia can be continued until the ammonia is completely driven off leaving a residue containing ammonia perchlorate in excess of 98% by weight.

Alternatively, the clear filtrate containing ammonium perchlorate can be mixed under pressure with a saturated ammoniacal solution previously prepared and being seeded with ammonium perchlorate crystals. The gradual release of the ammonia produces a saturated solution and causes precipitation of ammonium perchlorate which can be recovered by filtration. A small amount of liquid ammonia in the recovered product can be driven off by slow drying under low temperatures.

The ammonium perchlorate prepared according to the process of this invention may be further purified by redissolving in the liquid ammonia. The resultant liquid is subjected to filtration to remove insolubles, after which the ammonium perchlorate in liquid ammonium can then be recovered in a manner described hereinabove. The purification process may also be used advantageously for preparing high purity ammonium perchlorate from impure ammonium perchlorate containing water and other alkali salts such as those prepared by the prior processes.

Further to illustrate this invention, specific examples are described hereinbelow.

EXAMPLE I 275 grams of anhydrous sodium perchlorate and 148 grams of ammonium sulfate were introduced into a steel autoclave having a volume of 1.5 liters. After closing the autoclave, 600 grams of anhydrous liquid ammonia were introduced therein. This amount of liquid ammonia is sufficient to provide a final ammoniacal solution of ammonium perchlorate of approximately 30% by weight. The reactants in liquid ammonia were stirred for 30 minutes whereupon the reaction was complete. The reaction medium in the autoclave contained a suspension of sodium sulfate in an ammoniacal solution of ammonium perchlorate under a pressure of 12 kg./cm.$^2$. The suspension was then filtered while under pressure in order to separate the sodium sulfate. The resulting clear ammoniacal solution was passed into a second autoclave containing an already saturated solution of ammonium perchlorate obtained in a preceding operation and is seeded with small ammonium perchlorate crystals for the crystallization.

A progressive evaporation of the ammonia was then carried out by reducing the pressure of the gaseous phase. Abut 260 grams of ammonium perchlorate was obtained which was pure and anhydrous, titrating 98.8% and corresponding to a yield of 98%.

The precipitated sodium sulfate was then washed with anhydrous ammonia in order to recover the ammonium perchlorate which impregnated it. The sodium sulfate was then isolated by a complete removal of the ammonia. The ammoniacal washing solution could be used as the solvent in a subsequent repetition of the process.

EXAMPLE II 600 grams of an impure and moist ammonium perchlorate containing 1.5 of $Na_2SO_4$ and 1% of water was purified by introducing them into the autoclave described in Example I. After closing thereof, 600 grams of anhydrous ammonia were introduced so as to obtain an ammoniacal solution containing approximately 50% by weight of ammonium perchlorate. After agitating for 30 minutes, the sodium sulfate precipitate was filtered out and the ammoniacal solution of ammonium perchlorate was introduced into a second autoclave from which the ammonia was evaporated by reduction of pressure as described in Example I. There was obtained anhydrous ammonium perchlorate free of the initial sodium sulfate and titrating 99.2%.

After a certain number of operations the sodium sulfate recovered therefrom was washed with anhydrous ammonia and dried by complete evaporation of the liquid before being discarded. In this way, the ammonium perchlorate contained in the solution impregnated with sodium sulfate was recovered.

The yield in perchlorate was about 99%.

I claim:

1. A process for preparing substantially anhydrous perchlorate which comprises reacting sodium perchlorate or potassium perchlorate with about a stoichiometric amount of ammonium sulfate in a substantially anhydrous liquid ammonia at a temperature and a pressure sufficient to maintain the ammonia in the liquid state thereby precipitating alkali sulfate therefrom and simultaneously forming ammonium perchlorate, the amount of liquid ammonia used being sufficient to provide a final concentration of ammonium perchlorate therein equivalent to at least 10% by weight but less than the saturation point to avoid precipitation of ammonia perchlorate therefrom, separating the thus precipitated alkali sulfate from the reaction medium, gradually or progressively reducing the pressure on the ammonium perchlorate filtrate until the ammonia contained therein is driven off and thereafter recovering the ammonium perchlorate from the reaction medium having a purity of at least 98% by weight.

2. A process according to claim 1 wherein sodium perchlorate is used to react with ammonium sulfate at a superatmospheric pressure and at a corresponding temperature sufficient to maintain the ammonia in thee liquid state.

3. A process according to claim 1 wherein the ammonium perchlorate recovered is further purified by dissolving it in a substantially anhydrous ammonium at a pressure and a temperature sufficient to maintain the ammonia in the liquid state, filtering the reaction medium to remove the insolubles under the conditions required to maintain the ammonia in a liquid state and gradually or progressively evaporating the liquid ammonia to recover ammonium perchlorate therefrom which has a purity of about 99% by weight.

4. A process for preparing substantially anhydrous ammonium perchlorate which comprises reacting sodium perchlorate and about a stoichiometric amount of ammonium sulfate in a substantially anhydrous liquid ammonia at a superatmospheric pressure and an ambient temperature thereby precipitating sodium sulfate therefrom and simultaneously forming ammonium perchlorate, the amount of the liquid ammonia used being sufficient to maintain a final ammoniacal solution containing at least 10% of ammonium perchlorate but less than the saturation point thereof to avoid precipitation of ammonium perchlorate therefrom, filtering the ammoniacal solution to remove the thus precipitated sodium sulfate at superatmospheric pressure and ambient temperature, gradually reducing the pressure exerted on the filtrate to effect evaporation of the liquid ammonia and thereafter recovering the residue which contains essentially pure ammonium perchlorate having a purity in excess of 98% by weight.

5. A process according to claim 4 wherein the filtrate is seeded with ammonium perchlorate crystal prior to the evaporation of the liquid ammonia.

References Cited

UNITED STATES PATENTS

| 1,284,380 | 11/1918 | Le Sueur | 23—85 |
| 1,303,167 | 5/1919 | Collett | 23—85 |
| 1,338,357 | 4/1920 | Carlson | 23—85 |
| 1,342,956 | 6/1920 | Given et al. | 23—85 |
| 2,739,873 | 3/1956 | Schumacher | 23—85 |
| 2,972,514 | 2/1961 | Ritchey | 23—85 |
| 3,383,180 | 5/1968 | Kralik | 23—85 |

EDWARD STERN, Primary Examiner

U.S. Cl. X.R.

23—121, 302, 356, 367